(12) United States Patent
Kotlarski

(10) Patent No.: US 6,973,698 B1
(45) Date of Patent: Dec. 13, 2005

(54) WIPER BLADE FOR MOTOR VEHICLE WINDOWS

(75) Inventor: Thomas Kotlarski, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 09/445,046

(22) PCT Filed: Dec. 18, 1998

(86) PCT No.: PCT/DE98/03721

§ 371 (c)(1),
(2), (4) Date: Feb. 18, 2000

(87) PCT Pub. No.: WO99/51470

PCT Pub. Date: Oct. 14, 1999

(30) Foreign Application Priority Data

Apr. 1, 1998 (DE) .................................. 198 14 610

(51) Int. Cl.⁷ ................................................. B60S 1/38
(52) U.S. Cl. ............................... 15/250.43; 15/250.451
(58) Field of Search ..................... 15/250.43, 250.44, 15/250.361, 250.451, 250.48

(56) References Cited

U.S. PATENT DOCUMENTS 3,192,551 A  *  7/1965  Appel
4,028,770 A  *  6/1977  Appel ...................... 15/250.43
4,343,063 A  *  8/1982  Batt
4,807,326 A  *  2/1989  Arai et al.
5,485,650 A  *  1/1996  Swanepoel

FOREIGN PATENT DOCUMENTS

| DE | 1 505 357 |   | 5/1969 |
| DE | 1 247 161 |   | 1/1970 |
| EP |   279640  | * | 8/1988 |
| EP |   528643  | * | 2/1993 |

* cited by examiner

*Primary Examiner*—Gary K. Graham
(74) *Attorney, Agent, or Firm*—Michael J. Striker

(57) ABSTRACT

A wiper device with a wiper blade for cleaning windows of motor vehicles, in which the wiper blade can be moved back and forth laterally to its longitudinal span by a driven wipe arm which can be connected to the wiper blade and loads the same against the window. The wiper blade has an elongated wiper strip that can be placed against the window and an elongated spring-elastic carrying element, which has a connecting unit for the wiper arm and is disposed parallel to the longitudinal axis of the wiper strip to distribute a contact force over the entire wiper strip length. A particularly effective and low-noise operation of the wiper system is achieved because the contact force of the wiper strip against the window is greater in its center section than in at least one of two end sections of the wiper strip.

1 Claim, 3 Drawing Sheets

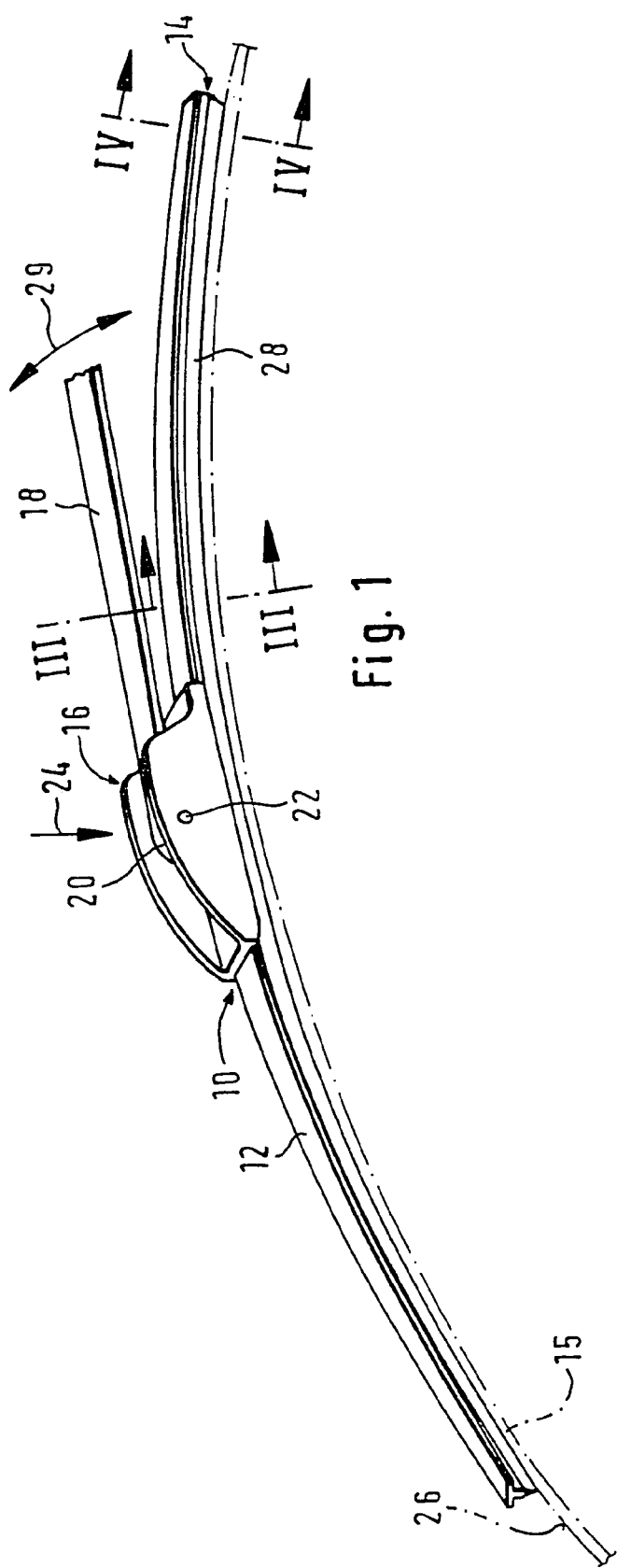

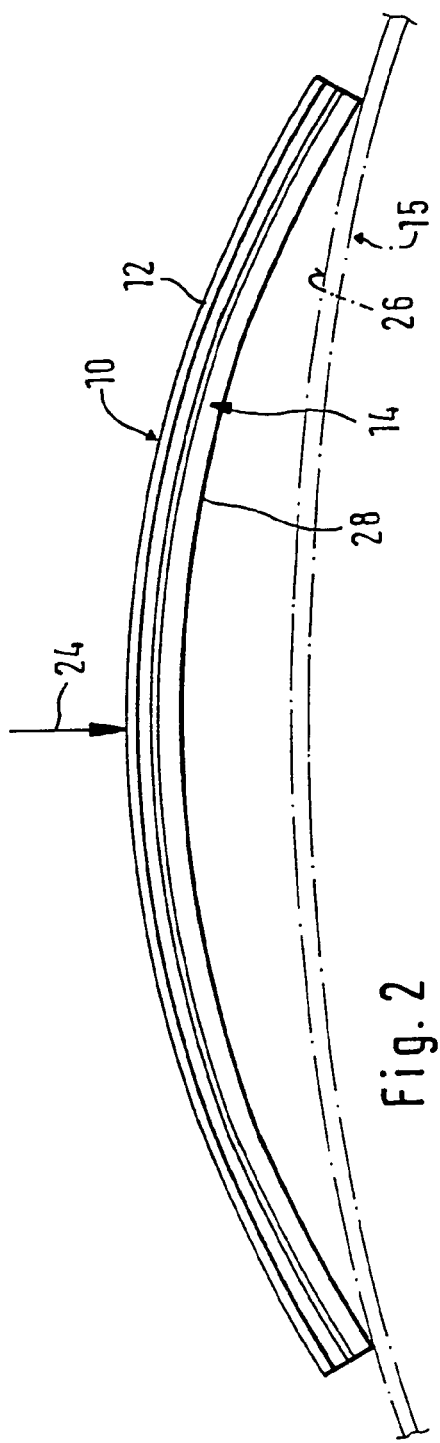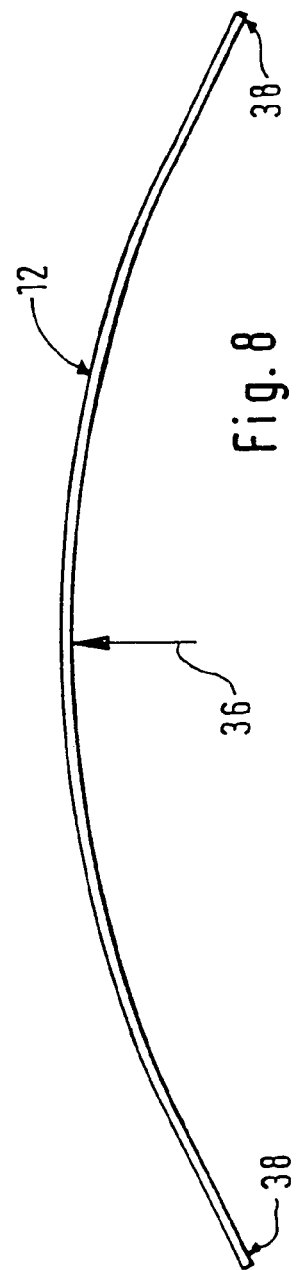

WIPER BLADE FOR MOTOR VEHICLE WINDOWS

Figure 3:
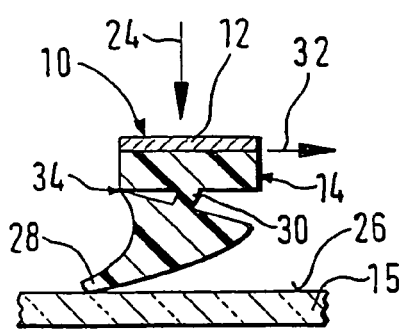

This application is a 371 of PCT/DE98/03721 filed Dec. 18, 1998.

PRIOR ART

In wiper blades of the type under consideration, the carrying element is intended to assure a predetermined distribution of the wiper arm-induced wiper blade pressing force—often also called pressure—against the window over the entire wiping field swept across by the wiper blade. Through a corresponding curvature of the unstressed carrying element—i.e. when the wiper blade is not resting against the window—the ends of the wiper strip, which is placed completely against the window during the operation of the wiper blade, are loaded toward the window by the carrying element which is then stressed, even when the curvature radii of spherically curved vehicle windows change with each wiper blade position. The curvature of the wiper blade must therefore be slightly sharper than the sharpest curvature measured in the wiping field on the window to be wiped. The carrying element consequently replaces the expensive support bracket construction with two spring rails disposed in the wiper strip, as is the practice in conventional wiper blades (published, non-examined German patent application 15 05 357).

In a known wiper blade of this type (German patent 12 47 161), in order to produce as uniform as possible a pressure loading of the wiper blade against a flat window over its entire length, a number of embodiments of the carrying element are provided.

In another known wiper blade according to the preamble to claim 1 (EP 05 28 643 B1), in order to produce a uniform pressure loading of the wiper blade against spherically curved windows, the pressure loading at the two end sections increases significantly when the wiper blade is pressed against a flat window.

The uniform pressure distribution over the entire wiper blade length desired in both instances, however, causes the wiper lip, which belongs to the wiper blade and does the actual wiping work, to abruptly flip over along its entire length from its one drag position into the other when the wiper blade reverses its working direction. This drag position is essential for an effective and low-noise operation of the wiper system. However, the abrupt flipping over of the wiper lip—which is inevitably connected with a back and forth movement of the wiper blade—produces undesirable knocking noises. Also, the matching of the carrying element stress to the desired pressure distribution, which is different from case to case, is problematic in the case of spherically curved windows.

SUMMARY OF THE INVENTION

According to the present invention, a wiper blade which can be moved back and forth across the window comprises an elongated wiper strip, and a spring-elastic carrying element wherein a contact force of the wiper strip against the window is greater in its center section then in at least one of two end sections thereof. In the wiper blade according to the present invention, in the vicinity of the reduced contact force, a steeper drag position of the wiper lip is produced in comparison to the region with the greater contact force. This steeper position of the wiper lip encourages its tilting-over process in the wiping direction reversal positions of the wiper blade, which is initiated there and then continued in the region that has the greater contact force. This prevents the abrupt snapping over of the entire wiper lip and the unpleasant knocking noise connected with it. This also eliminates the problems in the design of the carrying element with regard to the contact pressure distribution in spherically curved windows. Namely, it has turned out that the reduction of the contact pressure at the end section of the wiper blade does not inevitably also attend a reduction in the wiping quality.

It is particularly advantageous if the contact pressure of the wiper strip against the window is lower at its two end sections than in its center section because the tilting-over process of the wiper lip then takes place starting from both ends and is therefore finished more quickly.

With particularly problematic window curvatures, it can be useful if the contact pressure of the wiper strip against a window in its center section is at least almost uniform in magnitude and decreases at the end section(s).

A preferred embodiment of the carrying elements for achieving the desired distribution of the contact pressure provides that the carrying element has a concave curvature on its side oriented toward the window which is sharper than the sharpest curvature of the spherically curved window in the vicinity of the wiping field that can be swept across by the wiper blade and that the concave curvature in the center section of the carrying element is sharper than that of its end section(s).

Other advantageous embodiments and updates of the invention are disclosed in the following description of an exemplary embodiment shown in the respective drawings.

DRAWINGS

Figure 4:
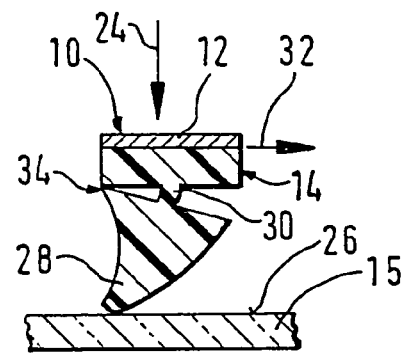
Figure 5:
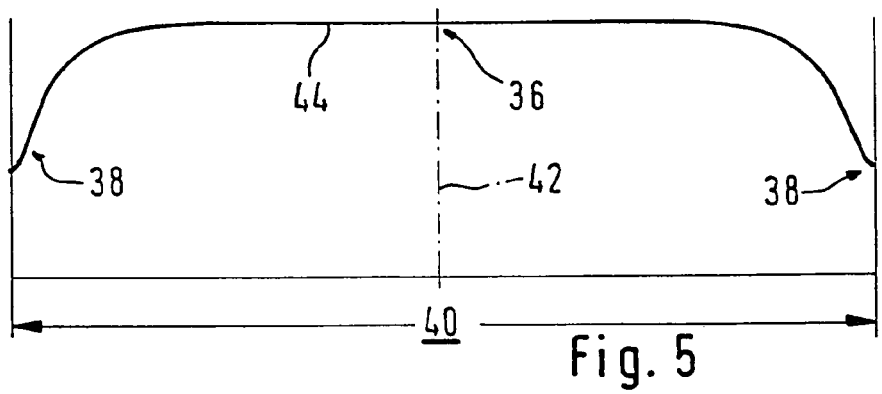
Figure 6:
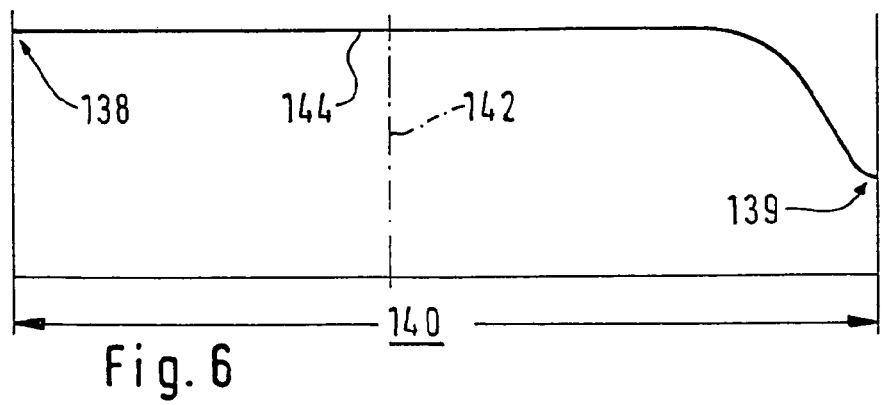
Figure 7:
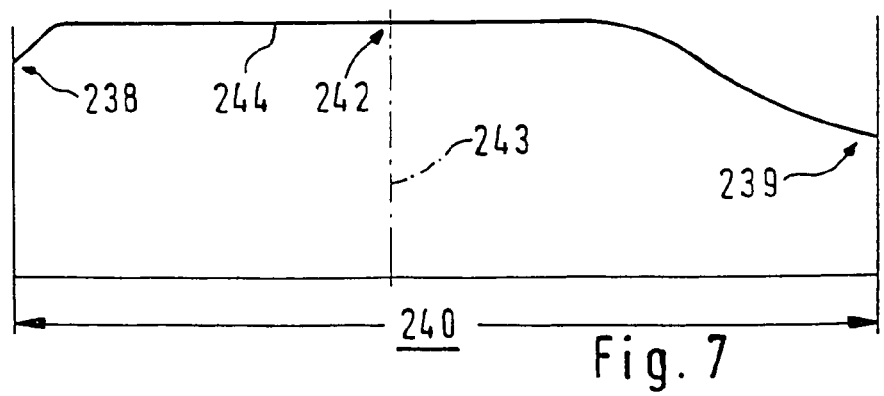

FIG. 1 is a perspective depiction of a wiper blade that is resting against the window and is connected to a wiper arm that is loaded in the direction of the window, FIG. 2 is a schematic representation of a side view of an unloaded wiper blade placed against the window, shown at a reduced scale in comparison to FIG. 1, FIG. 3 shows the sectional plane of the section through the wiper blade according to FIG. 1, along the line III—III in an enlarged depiction, FIG. 4 shows the sectional plane of a section through the wiper blade according to FIG. 1 along the line IV—IV in an enlarged depiction, FIG. 5 is a graphic representation of the wiper blade contact pressure over the wiper blade length according to a first possible embodiment of the invention, FIG. 6 is a graphic representation of the wiper blade contact pressure over the wiper blade length according to a different possible embodiment of the invention, FIG. 7 is a graphic representation of the wiper blade contact pressure over the wiper blade length according to another possible embodiment of the invention, and FIG. 8 is a schematic representation, not to scale, of a side view of a carrying element belonging to the wiper blade.

DESCRIPTION OF THE EXEMPLARY EMBODIMENT

A wiper blade 10 shown in FIG. 1 has an elongated, spring-elastic carrying element 12 for a wiper strip 14, and this carrying element 12 is shown separately in FIG. 8. As can be seen from FIGS. 1, 3, and 4, the carrying element 12 and the wiper strip 14 are connected to each other so that their longitudinal axes are parallel. A connecting device 16 is disposed on the top side of the carrying element 12 remote from the window 15 to be wiped—indicated with dot-and-dash lines in FIG. 1—and with the aid of this connecting device 16, the wiper blade 10 can be detachably connected to a driven wiper arm 18 that is supported on the body of a motor vehicle. The elongated, rubber-elastic wiper strip 14 is disposed on the underside of the carrying element 12 oriented toward the window 15. A hook, which is used as a reciprocal connecting means, is formed onto the free end 20 of the wiper arm 18 and encompasses a pivot bolt 22 belonging to the connecting device 16 of the wiper blade 10. The retention between the wiper arm 18 and the wiper blade 10 is performed by an intrinsically known securing means that is embodied as an adapter and is not shown in detail. The wiper arm 18 and therefore also its hook end 20 are loaded in the direction of the arrow 24 in relation to the window 15 to be wiped, whose surface to be wiped is indicated in FIGS. 1 and 2 by means of a dot-and-dash line 26. The force (arrow 24) places the wiper blade 10 over its entire length against the surface 26 of the window 15 to be wiped. Since the dot-and-dash line 26 depicted in FIG. 2 is intended to represent the sharpest curvature of the window surface in the region of the wiping field, it is clearly evident that the curvature of the as yet unloaded wiper blade 10 resting with both of its ends against the window is sharper than the maximal curvature of the spherically curved window 15. Due to the pressure (arrow 24), the wiper blade 10 rests over its entire length against the window surface 26 with its wiper lip 28 that belongs to the wiper strip 14. This produces a stress in the band-like spring-elastic carrying element 12, which assures a proper contact of the wiper strip 14 or the wiper lip 28 over its entire length against the motor vehicle window 15. During wiper operation, the wiper arm 18 moves the wiper blade 10 lateral to its longitudinal span, across the window 15. This wiping or working motion is indicated in FIG. 1 with the double arrow 29.

The particular embodiment of the wiper blade according to the invention will now be discussed in detail. As shown by the not-to-scale FIGS. 3 and 4, the wiper strip 14 is disposed on the lower band surface of the carrying element 12 oriented toward the window 15. Spaced apart from the carrying element 12, the wiper strip 14 is constricted from its two long sides in such a way that a tilting piece 30 remains in its longitudinal center region and extends over the entire length of the wiper strip 14. The tilting piece 30 transitions into the wiper lip 28, which has an essentially wedge-shaped cross section. Because of the contact force (arrow 24), the wiper blade or the wiper lip 28 is pressed against the surface 26 of the window 15 to be wiped, wherein due to the influence of the wiping movement—one of the two opposing wiping motions (double arrow 29) in particular is considered in FIGS. 3 and 4 and is indicated by the direction arrow 32—, this wiper lip 28 tilts into a so-called drag position in which the wiper lip is supported over its entire length against the part of the wiper strip 14 that is secured to the carrying element 12. This support, which is indicated in FIGS. 3 and 4 with the arrow 34, is always produced—depending on the respective wiping direction (double arrow 29 or arrow 32)—against the upper edge of the wiper lip 28 disposed toward the rear in the respective wiping direction so that it is always guided across the window in a so-called drag position. This drag position is required for an effective and low-noise operation of the wiper apparatus. The reversal of the drag position takes place in the so-called reversal position of the wiper blade 10 when this reverses its wiping motion (double arrow 29). The wiper blade executes a back and forth motion, which is induced by the tilting over of the wiper lip 28. The upward motion occurs counter to the direction 24 and consequently also counter to the contact force. In the other wiping direction directed counter to the arrow 32, a mirror image of the FIGS. 3 and 4 is consequently produced.

In order to produce as low-noise as possible a tilting over of the wiper lip 28 from its one drag position into its other drag position, the carrying element 12 used for distributing the contact force (arrow 24) is designed so that the contact force of the wiper strip 24 or the wiper lip 28 against the window surface 26 is greater in its center section 36 (FIG. 8) than in at least one of the two end sections 38. This fundamental concept, for example, can be incorporated, as shown in a graphic representations according to FIGS. 5 to 7.

According to FIG. 5, the carrying element 12 is designed so that viewed in terms of the length 40 of the wiper blade, its center region 36 has a virtually uniform contact force (line 44) and that this contact force 44 sharply decreases at both end sections 38 of the wiper blade. The dot-and-dash line 42 is intended to indicate a possible position of the pivot bolt 22, i.e. the engagement point of the wiper arm-induced contact force.

In another embodiment (FIG. 6), the carrying element 12 is designed so that viewed in terms of the length 140 of the wiper blade, starting from the one and 138 of the wiper blade until well beyond its linkage point (line 142), the contact force 24 is of a uniform magnitude (line 144) until it decreases sharply in the region of the other and 139 of the wiper blade. The possible linkage point of the wiper blade to the wiper arm has been labeled 142 in FIG. 6.

Another possible design of the wiper blade according to the invention, which is shown in FIG. 7, provides that the contact pressure or contact force (244) of the wiper lip 28 against the window surface 26 is essentially uniform in the center region 242 of the wiper blade—where the linkage point of the wiper arm 18 is disposed—and that it decreases slightly toward one and 238 of the wiper blade whereas it decreases considerably in the vicinity of the other and 239 of the wiper blade. With this design of the wiper blade, the engagement point 243 of the wiper arm 18, is disposed on the wiper blade outside the center of the wiper blade length 240, as in the design according to FIG. 6. Naturally, it is possible to use such a positioning of the linkage point even in wiper blades that are designed in accordance with FIG. 5. The different designs of the wiper blade can be required by particular window types, which differ from one another, for example due to the type of spherical curvatures of the windows.

FIG. 8 shows a possible curvature course of the carrying element 12, which can produce a pressure distribution of the wiper lip 28 against the window 15, as is graphically depicted in FIG. 5. With this spring-elastic carrying element 12, which when unloaded has a sharper concave curvature than the window in the region of the wiping field being swept across by the wiper blade, the curvature course is embodied so that it is sharper in the center section 36 of the carrying element than at its end sections 38. In order to achieve the desired contact force distribution, however, it is also conceivable to reduce the end sections 38 of the carrying element 12 cross sectionally so that a comparable effect is achieved.

Naturally, this possibility can also be combined with correspondingly coordinated changes in the curvature course of the carrying element 12.

The reduction of the contact force of the wiper lip 28 against the window surface 26 in the region of one or both wiper blade ends, prevents an abrupt flipping over or snapping over of the wiper lip 28 from its one drag position into its other drag position. In contrast, with the wiper blade according to the invention, a comparatively gentle tilting over of the wiper lip is produced, starting from the wiper blade end and continuing to the wiper lip center or to the other wiper lip end. FIGS. 3 and 4, in connection with FIG. 1, show that even with spherically curved windows, the less-loaded end sections of the wiper lip 28 still rest effectively against the window surface. A comparison of FIGS. 3 and 4 shows this, from which it is clear that in the less-loaded end region (FIG. 4), the wiper lip 28 is disposed more steeply in relation to the window surface 26 than in its center section (FIG. 3), where the greater contact force is in effect. This steeper disposition of the wiper lip 28 encourages the beginning of the tilting over of the wiper lip when the reverse motion of the wiping motion begins (double arrow 29).

It is common to all of the exemplary embodiments that the contact pressure (arrow 24) of the wiper strip 14 against the window 15 is greater in its center section 36 than in at least one of its two end sections 38. This is true even if in contrast to the currently shown wiper blade 10 with a one-piece carrying element 12 depicted as a spring rail, the carrying element is embodied as having a number of parts. The only crucial thing is the distribution of the contact pressure according to the invention.

What is claimed is:

1. A wiper blade for a wiping device of a motor vehicle for wiping a window of the motor vehicle, comprising an elongated wiper strip placeable against the window, and an elongated spring-elastic carrying element disposed on a side of the wiper strip remote from the window, said spring-elastic carrying element extending parallel to an axis of elongation of said wiper strip to distribute a contact force against the window over an entire length of said wiper strip, said wiper strip having a center section and two end sections, said contact force of said wiper strip being greater in said center section than in at least one of said two end sections, said spring-elastic carrying element has on a side thereof oriented toward the window a concave curvature that is sharper than the sharpest curvature of a spherically curved window in a region of a wiping field that can be swept across by said wiper blade and a concave curvature in said center section of the carrying element is sharper than in said sections thereof.

* * * * *